(12) United States Patent
Rus et al.

(10) Patent No.: US 11,808,590 B2
(45) Date of Patent: Nov. 7, 2023

(54) AUTONOMOUS NAVIGATION IN A CLUTTERED ENVIRONMENT

(71) Applicant: Massachusetts Institute of Technology, Cambridge, MA (US)

(72) Inventors: Daniela Rus, Weston, MA (US); Sertac Karaman, Cambridge, MA (US); Wilko Schwarting, Cambridge, MA (US); Anshula Gandhi, Cambridge, MA (US); Cristian-Ioan Vasile, Cambridge, MA (US); Alyssa Pierson, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/741,039

(22) Filed: Jan. 13, 2020

(65) Prior Publication Data

US 2020/0225053 A1 Jul. 16, 2020

Related U.S. Application Data

(60) Provisional application No. 62/791,383, filed on Jan. 11, 2019.

(51) Int. Cl.
*G01C 21/34* (2006.01)
*G01C 21/20* (2006.01)
*B60W 60/00* (2020.01)

(52) U.S. Cl.
CPC ..... *G01C 21/3461* (2013.01); *B60W 60/0015* (2020.02); *G01C 21/20* (2013.01)

(58) Field of Classification Search
CPC ......... B60W 2420/42; B60W 2420/52; B60W 10/20
See application file for complete search history.

(56) References Cited

U.S. PATENT DOCUMENTS

| 2008/0252433 | A1* | 10/2008 | Yguel | G08G 1/164 340/435 |
| 2011/0106306 | A1* | 5/2011 | Kim | B25J 9/1664 700/246 |
| 2017/0098131 | A1* | 4/2017 | Shashua | G06T 7/215 |
| 2017/0116783 | A1* | 4/2017 | Huang | G06T 7/246 |
| 2017/0256071 | A1* | 9/2017 | Laugier | G01S 17/931 |
| 2019/0113927 | A1* | 4/2019 | England | G05D 1/0221 |
| 2020/0118446 | A1* | 4/2020 | Saunders | G08G 5/0069 |

(Continued)

OTHER PUBLICATIONS

Wong, B., Spetsakis, M. "Scene Reconstruction and Robot Navigation Using Dynamic Fields". Jan. 2000. Autonomous Robots 8, 71-86 (2000). https://doi.org/10.1023/A:1008992902895 (Year: 2000).*

(Continued)

*Primary Examiner* — Rachid Bendidi
*Assistant Examiner* — Selena M Jin
(74) *Attorney, Agent, or Firm* — Occhiuti & Rohlicek LLP

(57) ABSTRACT

An approach to autonomous navigation of a vehicle augments a static map of an environment with a clutter map characterizing a risk of encountering an object that is not represented in the static map of the environment. For example, the clutter map may be based on locations and velocities of those objects, and route planning may avoid planning a path through locations that have a high risk of occupancy, and therefore potential delay or collision.

15 Claims, 3 Drawing Sheets

(56) References Cited

U.S. PATENT DOCUMENTS

2020/0132477 A1* 4/2020 Averilla .............. G01S 17/931
2020/0148215 A1* 5/2020 Mohajerin ........... G05D 1/0274
2021/0131823 A1* 5/2021 Giorgio ............... G01S 17/86

OTHER PUBLICATIONS

Tay, M. & Mekhnacha, Kamel & Chen, Cheng & Yguel, Manuel & Laugier, Christian. An Efficient Formulation of the Bayesian Occupation Filter for Target Tracking in Dynamic Environments. (Jan. 2008). International Journal of Vehicle Autonomous Systems. 6. 10.1504/IJVAS.2008.016483. (Year: 2008).*

M. Quigley, et al., "Ros: an open-source robot operating system," in ICRA Workshop on Open Source Software, 2009.

Elfes, Alberto. "Using occupancy grids for mobile robot perception and navigation." Computer 22, No. 6 (1989): 46-57.

Farnebäck, Gunnar. "Two-frame motion estimation based on polynomial expansion." In Scandinavian conference on Image analysis, pp. 363-370. Springer, Berlin, Heidelberg, 2003.

Horn, Berthold KP, and Brian G. Schunck. "Determining optical flow." In Techniques and Applications of Image Understanding, vol. 281, pp. 319-331. International Society for Optics and Photonics, 1981.

Karaman, Sertac, and Emilio Frazzoli. "Sampling-based algorithms for optimal motion planning." The international journal of robotics research 30, No. 7 (2011): 846-894.

Kucner, Tomasz, Jari Saarinen, Martin Magnusson, and Achim J. Lilienthal. "Conditional transition maps: Learning motion patterns in dynamic environments." In 2013 IEEE/RSJ International Conference on Intelligent Robots and Systems, pp. 1196-1201. IEEE, 2013.

Lu, David V., Dave Hershberger, and William D. Smart. "Layered costmaps for context-sensitive navigation." In 2014 IEEE/RSJ International Conference on Intelligent Robots and Systems, pp. 709-715. IEEE, 2014.

Lu, David V., Daniel B. Allan, and William D. Smart. "Tuning cost functions for social navigation." In International Conference on Social Robotics, pp. 442-451. Springer, Cham, 2013.

Molina, Sergi, Grzegorz Cielniak, Tomáš Krajník, and Tom Duckett. "Modelling and predicting rhythmic flow patterns in dynamic environments." In Annual Conference Towards Autonomous Robotic Systems, pp. 135-146. Springer, Cham, 2018.

Pierson, Alyssa, Wilko Schwarting, Sertac Karaman, and Daniela Rus. "Navigating congested environments with risk level sets." In 2018 IEEE International Conference on Robotics and Automation (ICRA), pp. 1-8. IEEE, 2018.

Souza, Anderson, and Luiz MG Gonçalves. "Occupancy-elevation grid: an alternative approach for robotic mapping and navigation." Robotica 34, No. 11 (2016): 2592-2609.

* cited by examiner

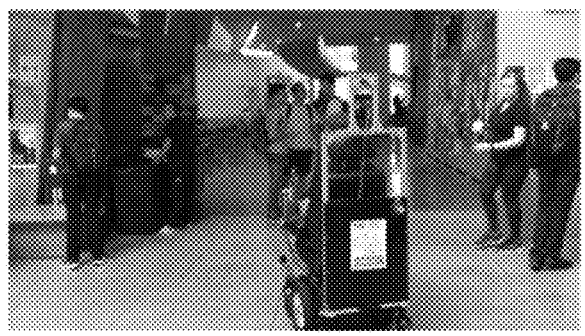
FIG. 2(A)　　　　　　　　FIG. 2(B)
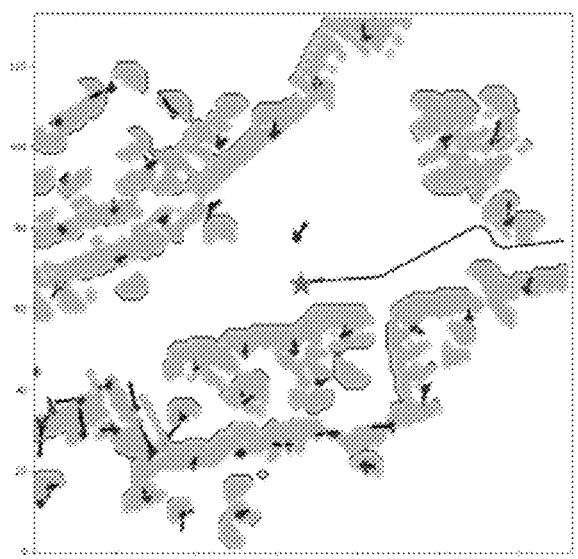
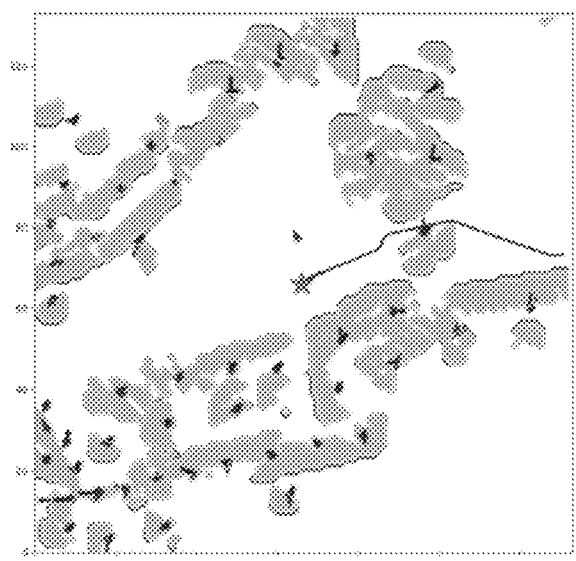
FIG. 3(A)　　　　　　　　FIG. 3(B)

AUTONOMOUS NAVIGATION IN A CLUTTERED ENVIRONMENT

CROSS-REFERENCES TO RELATED APPLICATIONS

This application claims the benefit of U.S. Provisional Application No. 62/791,383 filed Jan. 11, 2019, which is incorporated herein by reference.

STATEMENT AS TO FEDERALLY SPONSORED RESEARCH OR DEVELOPMENT

This invention was made with government support under Grant 1723943 awarded by the National Science Foundation (NSF), and under Grant N00014-18-1-2830 awarded by the Office of Naval Research (ONR). The government has certain rights in the invention.

BACKGROUND OF THE INVENTION

This invention relates to autonomous navigation in a cluttered environment.

Autonomous mobility comes in many forms and packages: cars, trucks, golf carts, wheelchairs, and delivery buggies, to name a few. As these vehicles are integrated into human-centric environments, autonomous systems must detect and adapt to the presence of moving agents and obstacles. Operation of the vehicle may depend on the level of congestion and the nature of the motion.

In recent years, sensing and perception technology has made significant advances in the ability to parse and understand an environment. However, these perception systems remain prohibitively expensive at the consumer scale. Furthermore, many of these approaches require advanced algorithms with significant computational overhead or are limited in the environmental complexity they can handle.

SUMMARY OF THE INVENTION

In one general aspect, an approach to autonomous navigation of a vehicle augments a static map of an environment with a dynamic map (also referred to as a "clutter map") characterizing a risk of encountering an object that is not represented in the static map of the environment. For example, the clutter map may be based on locations and velocities of those objects, and route planning may avoid planning a path through locations that have a high risk of occupancy, and therefore potential delay or collision.

In another general aspect, the clutter map is determined with minimal sensor data and light computational loads based on approximations that do not necessarily require accurate tracking of specific objects in the environment. Generally, these approximations may be based on the use of mapping risk density and velocity fields in the vehicle's environment and/or clustering techniques to combine the impact of groups of objects.

One of many applications of these techniques is autonomous navigation of an indoor vehicle, for example an autonomous wheelchair, in a building in which a building map of the hallways, doors, rooms, etc. may be known, but the vehicle has to navigate among a dense flow of pedestrian traffic around it. The clutter may also include relatively static objects that are not represented in the building map, such as a table or a parked cleaning cart. Although there may be multiple different classes of objects, for example, pedestrians and furniture, the approaches do not require classification of the objects or treating them in different ways.

In one aspect, in general, a method for vehicle navigation comprises planning a route from a current location of the vehicle to a destination location in an environment. The planning includes acquiring sensor data characterizing locations of objects in the environment, where at least some of the objects are non-permanent moving objects (e.g., "clutter"). A density over locations in the environment is determined from the sensor data. A velocity field over location in the environment is determined from the density and at least one prior density, which is determined from prior sensor data. A risk map for locations in the environment is determined from the density and the velocity field. A path toward the destination location is then determined using the risk map in a route planning procedure.

Aspects can include one or more of the following features.

The vehicle is caused to traverse at least an initial portion of the path.

The vehicle is an autonomous vehicle, for instance, an autonomous wheelchair configured to navigate among pedestrians.

Determining the velocity field comprises clustering the density. In some examples, determining the velocity field further includes, for at least some of the clusters, determining a velocity associated with the cluster. For instance, a velocity associated with the cluster includes using a location of the cluster and a location of a corresponding cluster determined from the prior density.

Determining the velocity field comprises determining a density flow using the density and the prior density. In some examples, determining the density flow includes using an optical flow algorithm to determine the density flow.

Determining the risk map includes accentuating the density in directions associated with movement in the environment.

Determining a risk map includes thresholding the density.

Determining the path toward the destination further includes using a static map of the environment.

The route planning procedure comprises a random tree planner procedure.

In another aspect, in general, a navigation system is configured to perform all the steps of any of the methods set forth above.

In another aspect, in general, a non-transitory machine-readable medium has instructions stored thereon. When executed by a processor, the instructions cause the processor to perform all the steps of any of the methods set forth above.

Other features and advantages of the invention are apparent from the following description, and from the claims.

BRIEF DESCRIPTION OF THE DRAWINGS

FIGS. 2A-D are photographs showing an autonomous wheelchair in an experimental use.

FIGS. 3A-D are dynamic maps corresponding to the photographs of FIGS. 2A-D, respectively.

DETAILED DESCRIPTION

1 Overview

The approaches described herein address a problem of autonomous navigation in a cluttered environment. The cluttered environment may include a number of obstacles, which may be static or moving. As an example, an autonomous powered wheelchair may be navigating down a busy corridor in the presence of heavy pedestrian traffic and possible temporary static obstacles, such as furniture. The wheelchair has a prior map of the environment, including walls, doorways, stairs, and the like. Given some initial starting location, the vehicle endeavors to navigate to a goal location along a path that it determines. The prior map ("static map") does not have to include information about dynamic obstacles, such as other pedestrians, or non-permanent obstructions, such as tables and chairs. Due to the random and cluttered nature of this environment, such as large crowds moving through the corridors, it may not be practical to rely on object detection for the wheelchair to navigate as such a scheme may require substantial computation resources in order to track the other objects.

Figure 1:
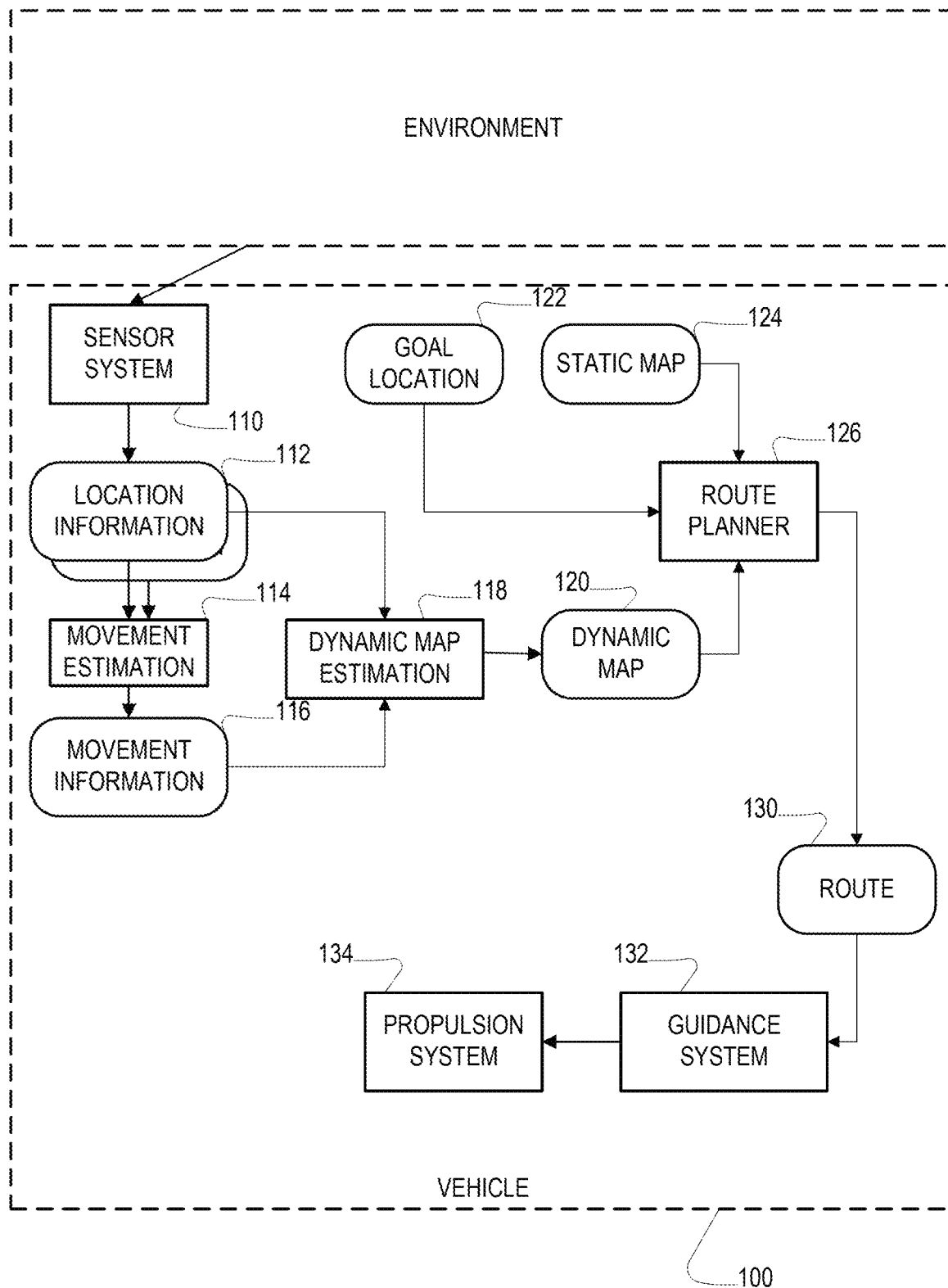
FIG. 1 is block diagram of components of an autonomous vehicle.

Referring to FIG. 1, an autonomous vehicle 100 has two sources of information about the environment: a sensor system 110 (e.g., a LIDAR system) that it uses to determine information about objects (e.g., "clutter") in the environment, and a static map 124, which identifies where there are static (e.g., permanent) objects in the environment, such as walls, doorways, and the like. As discussed in more detail below, each of a number of embodiments use the output of the sensor system 110 to derive a dynamic map characterizing where there are likely to be dynamic objects that may impede the vehicle's motion. A route planner 126 uses the goal location 122 to which the vehicle wishes to travel, the static map 124, and the derived dynamic map 120 to determine a route 130 to the goal location. This route is used until it is replanned, for example, because new sensor data is available from the sensor system 110, and provided to a guidance system 132 that follows the planned route by commanding a propulsion system 134 of the vehicle to cause it to physically move. Note illustrated in FIG. 1 is the computational hardware used to implement the functional blocks of FIG. 1. This hardware may include a processor that executes procedures implementing the blocks, and storage for the processor instructions and data used in the procedures.

The problem can be formulated as the autonomous vehicle navigating in a two or three dimensional region such that a point in the region corresponds to a vector $q \in \mathbb{R}^N$, for N=2 or N=3. If there was no clutter, the vehicle could plan a route to a desired destination based solely on the prior map. For a wheelchair in a crowded hallway, this would most likely result in the wheelchair encountering people in the way, and it would likely detect those people and have to stop to avoid hitting them (e.g., based on local sensor data), and possibly replan the route if there was no way through a crowd of people.

In a number of embodiments described below, the vehicle makes use of an optimal rapidly exploring random tree planner (RRT*), as described in S. Karaman and E. Frazzoli, "Sampling-based Algorithms for Optimal Motion Planning," *International Journal of Robotics Research*, vol. 30, no. 7, pp. 846-894, June 2011, which is incorporated herein by reference. Very generally, this route-planning procedure constructs a random tree of feasible routes testing possible new nodes at corresponding locations in the environment for possible addition to the tree using a Boolean function of two locations in the environment that indicates whether the direct path between those locations is obstacle free. For example, a static building map can be used to determine that there is a wall separating a straight line between two locations. As described below, this Boolean function is further based on information related to the clutter objects in the environment. It should be understood that this is but one of many route planning procedures, and the approaches to accounting of clutter in the environment are directly applicable to a wide range of such procedures with little or no modification of the techniques described below.

To address the non-static obstacles (e.g., pedestrians) in the environment, also referred to as "agents," the route planning makes use of a "risk density" (also referred to as a "risk map" below) of the environment, denoted H(q). This map includes a quantification of the expected occupancy at a point q, and this expected occupancy can be taken not account in the planning of a route. A high-risk density at a point indicates a high risk of encountering an obstacle at that point. For route planning, this risk map may be processed to form a binary "clutter map" (e.g., the dynamic map 120 of FIG. 1), denoted L(q) in some discussion below), by treating all points above a prescribed threshold as essentially being obstacles. The static map and the clutter map are then combined and the route planning procedure treats two points in the environment as having an obstacle between them if either the static map shows that a static feature separates the points or the clutter map separates the points because there is a high risk density between those points. In this way, the route planning can prefer relatively unoccupied paths, thereby reducing, but not necessarily completely eliminating, encounters with obstacles along the path. Alternative route planning procedures may also be used, for example, with the goal of minimizing a cumulative or maximum risk along possible paths.

Note that as described further below, the clutter map is not necessarily based solely on the present locations of obstacles. Rather, it may incorporate at least some knowledge about the velocity of the objects. In the example, this enables the wheelchair to plan a route that avoids the locations at which the object is expected in the future, and therefore the clutter map serves as a proxy for the intention of agents in the environment. That is, the vehicle can avoid planning a likely collision course with an object.

There are a number of different ways that the clutter map may be computed, and in general, the same or similar route planning procedure can be used. These different ways include an embodiment based on explicit object localization, as well as a number of embodiments that are based on estimating an occupancy density and corresponding velocity field.

2 Object Localization

One way to compute the risk density is to enumerate the agents (clutter objects) in an environment, say N separate agents, and for each agent n track its location, represented as a real-valued vector $x_n \in \mathbb{R}^N$, as well as its velocity in the environment, represented as a real-valued vector $\dot{x} \in \mathbb{R}^N$. The collection of locations and velocities is denoted $(x, \dot{x})$. Given this knowledge of the agents, the risk density is represented as a function of a position of interest, q, and the agents' locations and velocities, represented as a function $H(q, x, \dot{x})$. Referring to FIG. 1, in this approach, the location information 112 comprises the locations (x), and the movement information 116 comprises the velocities ($\dot{x}$), which are either determined directly by the sensor system 110 or estimated from the location information by the movement estimation component 114.

Without considering the velocities of the agents, one choice of a risk density function is a sum of Gaussian peaks:

$$H(q, x) = \sum_n \exp(-(q - x_n)^T \Omega (q - x_n)).$$

where $\Omega$ is a diagonal matrix of inverse square standard deviations. For example, these standard deviations may be based on estimates of uncertainty of the locations of the agents, thereby smoothing out the location estimates of the agents.

In order to account for the motion of each agent, the dynamic map estimation 118 in this approach implements an alternative in which the peak for each agent is skewed according to its velocity with a function of the form $$f((q-x_n) \cdot \dot{x}_n)$$

where • is the inner or "dot" product of vectors, and therefore the argument is positive for points q in the direction of motion of the agent relative to its current location, and negative in opposite direction. The function $f(s)$ in this embodiment is a logistic function $1/1+\exp(-\alpha s)$, so that points in the direction of motion are closer to 1.0 and points opposite the direction of motion are closer to 0.0. The overall risk density function is then formed as a sum of skewed peaks:

$$H(q, x, \dot{x}) = \sum_n f((q - x_n) \cdot \dot{x}_n) \exp(-(q - x_n)^T \Omega (q - x_n)) = \sum_n \frac{\exp(-(q - x_n)^T \Omega (q - x_n))}{1 + \exp(-\alpha(q - x_n) \cdot \dot{x}_n)}$$

In one implementation, the autonomous vehicle has a scanner and locally determines the agent locations and velocities. For example, the wheelchair has a laser scanner, and knows its location and orientation in the environment, and uses the scanner to compute the agents' locations and velocities. In alternative embodiments, this information may be computed centrally and distributed to the autonomous vehicle or computed by a distributed set of vehicles and shared among them.

As introduced above, the risk density is thresholded at a level, denoted $H_P$, and a dynamic map 120 is formed as the set of locations with risk density below the threshold (i.e., locations that are less likely to have an obstacle than locations with risk density equal to $H_P$).

$$L_P = \{q | H(q, x, \dot{x}) \leq H_P\}.$$

This dynamic map is then used by the route planner 126 of the vehicle for planning its route 130. Note that the higher the threshold $H_P$, the higher the likelihood of encountering an obstacle, but in general the more direct the route is to the goal location.

3 Occupancy Density And Velocity Fields

In a number of alternative embodiments, rather than determining locations of individual agents, the vehicle directly determines a density function $\rho(q)$ directly. One approach to computing this density is by first computing an occupancy probability over a discrete set of locations, for example, over a regular grid. Then the density function can be computed as a smoothing of the discrete occupancy probabilities.

Rather than computing velocities of individual agents, in these embodiments a velocity field $v(q)$ is computed from the output of the sensor system 110 in one of a number a ways presented below. In order to skew the density function in the direction of motion of the objects, it is multiplied by $$f(-\nabla \rho(q) \cdot v(q))$$

where $f( )$ may be chosen to be a logistic function as introduced above. In this way, the density is accentuated in the direction of velocity flow and reduced in the opposite direction. One method of computing the gradient, $\nabla \rho(q)$, is to use the values of $\rho(q)$ on a grid, and to approximate the gradient using the grid values.

Therefore, given the velocity field, and an approximation of the gradient of the occupancy density, the overall alternative risk density is computed as $$H(q, \rho, V) = \sum_n f(-\nabla \rho(q) \cdot V(q)) \rho(q) = \sum_n \frac{\rho(q)}{1 + \exp(\alpha \nabla \rho(q) \cdot V(q))}$$

4 Velocity Field By Clustering

One approach to approximating the velocity field, $v(q)$, is based on a clustering technique. In this approach, the density function $\rho(q)$ comprises the location information 112 output of the sensor system 110. As part of the movement estimation 114, this density function is clustered to identify a predetermined number of centroids, $(c_1, \ldots, c_K)$, where $c_k \in \mathbb{R}^N$, of the function. For example, K=50 clusters are used. The parameter K can be tuned per environment. In general, with too few clusters, you will not accurately capture all of the agents. With more clusters, the duplicate clusters may appear along the edge of the map on walls. The set of centroids defines a set of Voronoi cells, where the Voronoi cell for a particular centroid is the set of locations that are closer to that centroid than any other of the centroids. For example, a variant of a k-means clustering approach is used to iteratively minimize a mean squared criterion $$\Sigma_k \Sigma_{q \in V_k} \rho(q)(q - c_k)^2$$

where $V_k$ is the Voronoi cell corresponding to centroid $c_k$.

In the discussion that follows, a superscript of a quantity denotes the time of the data samples on which that quantity is determined. For example, $\rho^t(q)$ denotes the density determined from data at time t and $\rho^{t+\Delta t}(q)$ denotes the density at a future sampling time $t+\Delta t$.

In this approach, having computed the centroids $(c_1^t, \ldots, c_K^t)$ from $\rho^t$, new data is collected at a time $t+\Delta t$ yielding a new density function $\rho^{t+\Delta t}$. The iterative clustering procedure for time $t+\Delta t$ is initialized with the previous centroids $$(c_1^{t+\Delta t}, \ldots, c_K^{t+\Delta t}) \leftarrow (c_1^t, \ldots, c_K^t),$$

and then the iterative minimization of the criterion yields the new centroid locations. Because of the initialization, the relationship between the centroids is maintained, and the velocity of the $k^{th}$ centroid is approximated as a backward first-order difference $$v_k = (c_k^t - c_k^{t-\Delta t})/\Delta t.$$

Having computed the velocities of the centroids, the movement estimation 114 uses the centroid velocities by assigning each velocity to all points in a corresponding Voronoi cell $$v(q) = v_k \text{ for all } q \in V_k.$$

Note that the risk density H at time t to be a function of $\rho^t$, $\rho^{t-\Delta t}$ and $\Delta t$. In alternative embodiments, the risk density may be based on a series of more than two density functions, for example, for the purpose of smoothing or estimation of higher order spatial or time derivatives. Also, in alternative approaches, the velocity field is not necessarily assumed to be piecewise constant over the Voronoi cells and a smoothing may be applied.

Furthermore, other clustering approaches may be used, for example, based on tree splitting approaches, and rather than clustering and Gaussian kernel approach (e.g., Gaussian mixture model) estimated using an Expectation-Maximization algorithm may be used.

5 Velocity Field By Density Flow

Another approach to approximating the velocity field, $v(q)$, is based on estimating a density flow in a manner analogous to computing optical flow based on successive images in a video processing technique. To simplify the discussion, the time dependence of the density, and the example for a N=2 dimensional domain, are made explicit in the following notation:

$$\rho^t(q) \equiv \rho(x,y,t).$$

The density flow approach makes an approximation that assumes that incrementally the density at point (x, y) at time t is found at point (x+$\Delta$x, y+$\Delta$y) at time t+$\Delta$t such that $$\rho(x,y,t) = \rho(x+\Delta x, y+\Delta y, t+\Delta t),$$

which as a first order Taylor expansion (i.e., omitting higher-order terms (H.O.T.)), as $$\rho(x + \Delta x, y + \Delta y, t + \Delta t) \approx \rho(x, y, t) + \frac{\partial \rho}{\partial x}\Delta x + \frac{\partial \rho}{\partial y}\Delta y + \frac{\partial \rho}{\partial t}\Delta t.$$

Combining the previous two equations yields a constraint $$\frac{\partial \rho}{\partial x}\frac{\Delta x}{\Delta t} + \frac{\partial \rho}{\partial y}\frac{\Delta y}{\Delta t} + \frac{\partial \rho}{\partial t} = 0,$$

which can be expressed as $$\nabla \rho^t(q) + \partial \rho^t(q)/\partial t = 0.$$

Therefore, by estimating $\nabla \rho^t(q)$ at all points q, and using $\rho^t$ and $\rho^{t-\Delta t}$ to estimate $\partial \rho^t(q)/\partial t$ at all points q, the velocity field $v^t(q)$ is computed as a solution to a set of linear equations.

Alternative velocity field computation approaches may be used as well, for example, based on image optical flow techniques, such as using the Horn-Schunck optical flow algorithm (Horn, Berthold K P, and Brian G. Schunck. "Determining optical flow." *Artificial intelligence* 17, no. 1-3 (1981): 185-203).

6 Control Policy Using Density And Velocity Field

In the approaches in which a density function $\rho(q)$ and a velocity field $v(q)$ are computed at each time, the control policy is based on performing the following steps at each time:

1. Take raw measurements, for example from the vehicle.
2. Compute density $\rho^t$ from the measurements.
3. Estimated the velocity field $v^t$ from $\rho^t$ as well as one or more previous densities $\rho^{t+\Delta t}$.
4. Compute dynamic risk H.
5. Compute risk-bounded path using RRT*.

7 Implementation And Alternatives

In one implementation, an autonomous wheelchair includes localization sensors (e.g., relative to beacons or other reference points in the environment) from which it locally estimates its pose. The wheelchair is also equipped with 2D laser scanners to construct occupancy grids about the environment relative to its current location and orientation, from which the density $\rho(q)$ is estimated. The wheelchair has an on-board computer, including a processor, memory, and interface to the localization and scanning hardware, and the computer executes instructions stored in the memory to perform the computational steps described above.

The acquisition of the data to determine the occupancy information may be based on a variety of technologies, including without limitation LIDAR, and vision (e.g., stereo) based approaches.

8 Experimental Results

An experiment was performed on a wheelchair modified for drive-by-wire, which runs an autonomy stack composed of control, navigation, and sensor modules implemented in ROS (M. Quigley, et al., "Ros: an open-source robot operating system," in *ICRA Workshop on Open Source Software*, 2009). The sensor modules interface with the laser scanners, encoders, and an IMU that equip the wheelchair. The control modules provide linear and angular velocity controllers, where the reference signals are given by the navigation modules, as well as emergency stop and human-input control signals. The navigation stack comprises localization, path planner, path following, and costmap modules. Localization is performed using the AMCL package, which is a probabilistic localization system for a robot moving in 2D that integrates odometry poses computed from the encoders and IMU data, and laser scan data registered into an a priori constructed map. The location of the wheelchair together with a reference path and costmaps are used by an RRT*planner to generate obstacle-free paths in the environment. The wheelchair uses a pure-pursuit controller for path following, which provides the steering control signal. For simplicity, the wheelchair uses a constant linear velocity, unless an obstacle is too close to the wheelchair and all velocities are set to zero. Collision checking is performed using a discrete costmap-based approach, where grids are populated with laser scan measurements. The ROS package computes snapshot costmaps that integrate static map information with the dynamic map of obstacles generated from the laser scan data and inflated radially for safety.

Figure 2C:
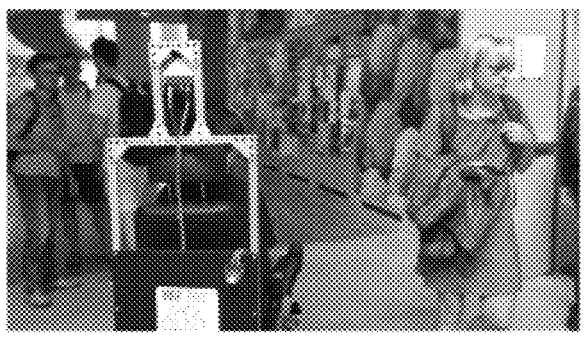
Figure 2D:
Figure 3C:
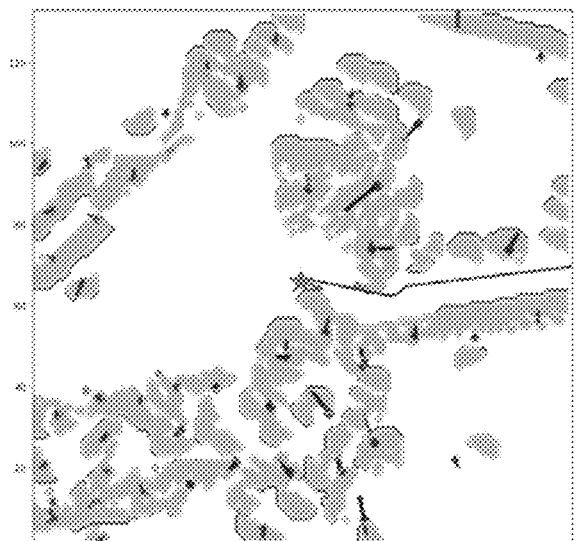
Figure 3D:
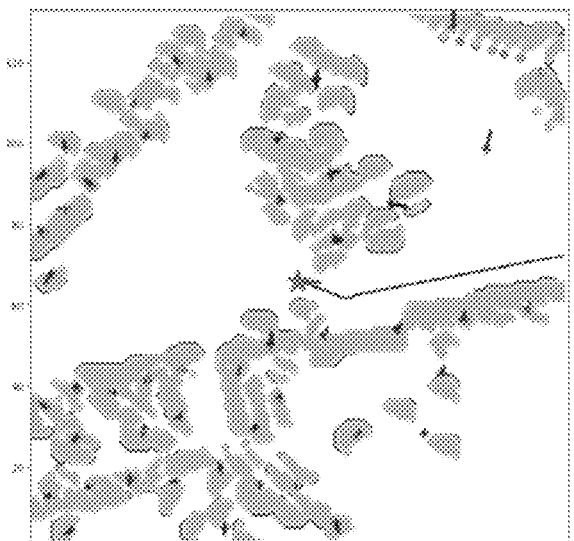

The dynamic risk density approach described above was used to generate discrete (grid) risk cost functions that take into account the underlying velocity fields of cluttered (occupied) space. The cost function is passed to the path planner module that computes obstacle-free paths at the current time, and potentially within a future time horizon. The dynamic risk density computation ran at 60 Hz on a Dell Precision 5520 laptop with Core i7-7th gen processor and 32 GB RAM, allowing the wheelchair to react quickly to the environment and operate smoothly. FIGS. 2(A-D) shows the wheelchair in four successive locations as it navigates a crowed hallway. FIGS. 3(A-D) show the corresponding dynamic maps, and the planned route (indicated by a line) from the wheelchair's current location (indicated by a star).

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for vehicle navigation comprising planning a route from a current location of a vehicle to a destination location in an environment, the planning including:
   acquiring sensor data characterizing locations of objects in the environment, at least some of the objects being non-permanent moving objects;
   determining an occupancy density $\rho(q)$ over locations in the environment from the sensor data, where q represents a location in a two-dimensional or three-dimensional physical environment of the vehicle;
   determining a velocity field over locations in the environment from the occupancy density and at least one prior occupancy density determined from prior sensor data, wherein determining the velocity field comprises determining an occupancy density flow by processing the occupancy density and the prior occupancy density using optical flow techniques;
   determining a risk map for locations in the environment from the occupancy density and the velocity field;
   determining a path toward the destination location using the risk map in a route planning procedure; and
   causing the vehicle to traverse at least an initial portion of the path.

2. The method of claim 1, wherein the vehicle is an autonomous vehicle.

3. The method of claim 1, wherein determining the velocity field comprises clustering the occupancy density.

4. The method of claim 3, wherein determining the velocity field further comprises for at least some of the clusters of occupancy density determining a velocity associated with the cluster.

5. The method of claim 4, wherein determining a velocity associated with the cluster includes using a location of the cluster and a location of a corresponding cluster determined from the prior occupancy density.

6. The method of claim 1, wherein determining a risk map includes accentuating the occupancy density in directions associated with movement in the environment.

7. The method of claim 1, wherein determining a risk map includes thresholding the occupancy density.

8. The method of claim 1, wherein determining the path toward the destination further includes using a static map of the environment.

9. The method of claim, 1, wherein the route planning procedure comprises a random tree planner procedure.

10. The method of claim 1, wherein the sensor data comprises an occupancy grid for a grid of locations in the environment of the vehicle.

11. The method of claim 1, wherein the sensor data comprises an occupancy grid determined using at least one of a LIDAR sensor and a laser sensor.

12. The method of claim 1, wherein determining the velocity field over locations in the environment includes processing the occupancy density and an occupancy density of the prior density to yield the velocity field.

13. The method of claim 12, wherein determining the risk map for locations in the environment from the occupancy density and the velocity field includes processing the occupancy density and the velocity field.

14. A navigation system comprising a controller configured to plan a route from a current location of a vehicle to a destination location in an environment, the planning including:
   acquiring sensor data characterizing locations of objects in the environment, at least some of the objects being non-permanent moving objects;
   determining an occupancy density $\rho(q)$ over locations in the environment from the sensor data, where q represents a location in a two-dimensional or three-dimensional physical environment of the vehicle;
   determining a velocity field over locations in the environment from the occupancy density and at least one prior occupancy density determined from prior sensor data, wherein determining the velocity field comprises determining an occupancy density flow by processing the occupancy density and the prior occupancy density using optical flow techniques;
   determining a risk map for locations in the environment from the occupancy density and the velocity field;
   determining a path toward the destination location using the risk map in a route planning procedure; and
   causing the vehicle to traverse at least an initial portion of the path.

15. A vehicle navigation system comprising:
   a sensor system for acquiring sensor data characterizing locations of objects in the environment;
   a computer implemented dynamic map estimation component for determining an occupancy density $\rho(q)$ over locations in an environment from the sensor data, where q represents a location in a two-dimensional or three-dimensional physical environment of the vehicle, determining a velocity field over locations in the environment from the occupancy density and at least one prior occupancy density determined from prior sensor data, wherein determining the velocity field comprises determining an occupancy density flow by processing the occupancy density and the prior occupancy density using optical flow techniques, and determining a risk map for locations in the environment from the occupancy density and the velocity field;
   a computer implemented route planner for determining a path toward a destination location using the risk map; and
   a controller for causing the vehicle to traverse at least an initial portion of the path.

* * * * *